Figure 1:
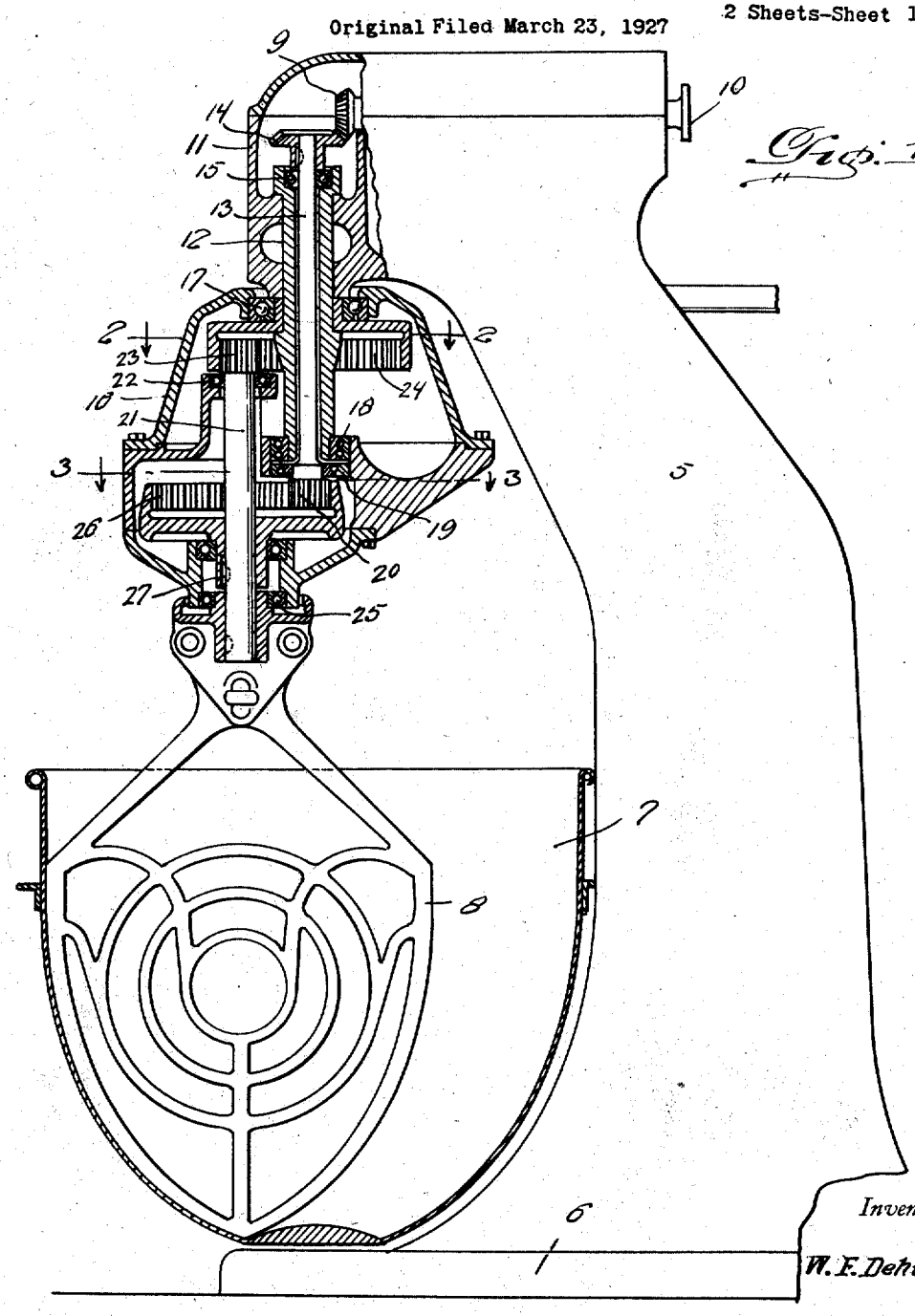

Feb. 12, 1929. W. F. DEHUFF Re. 17,215

MIXING MACHINE

Original Filed March 23, 1927 2 Sheets-Sheet 1

Inventor
W. F. Dehuff.

By Clarence O'Brien
Attorney

Feb. 12, 1929. W. F. DEHUFF Re. 17,215

MIXING MACHINE

Original Filed March 23, 1927 2 Sheets-Sheet 2

Inventor
W. F. Dehuff.

By Clarence A. O'Brien
Attorney

Reissued Feb. 12, 1929. Re. 17,215

UNITED STATES PATENT OFFICE.

WALTER F. DEHUFF, OF GLEN ROCK, PENNSYLVANIA, ASSIGNOR TO GLEN MIXER COMPANY, INCORPORATED, OF GLEN ROCK, PENNSYLVANIA, A CORPORATION OF PENNSYLVANIA.

MIXING MACHINE.

Original No. 1,656,665, dated January 17, 1928, Serial No. 177,763, filed March 23, 1927. Application for reissue filed November 8, 1928. Serial No. 318,060.

The present invention relates generally to mixing machines and more particularly to a drive for the beater thereof.

The principal object of the invention lies in the provision of a beater drive mechanism and is directed to the beater which has numerous advantages as will appear later.

Another very important object of the invention lies in the provision of a drive mechanism for a mixing machine, wherein the structure is simple, compact, convenient, thoroughly efficient and reliable in operation, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

Figure 2:
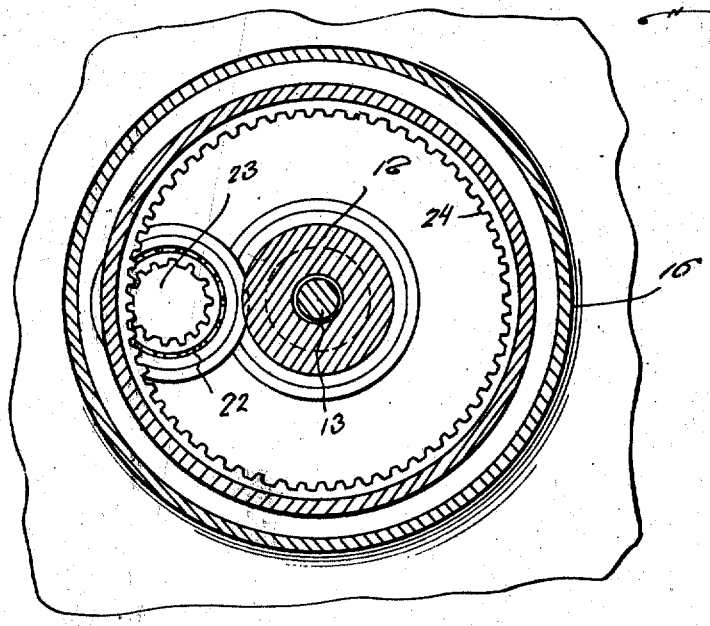
Figure 3:
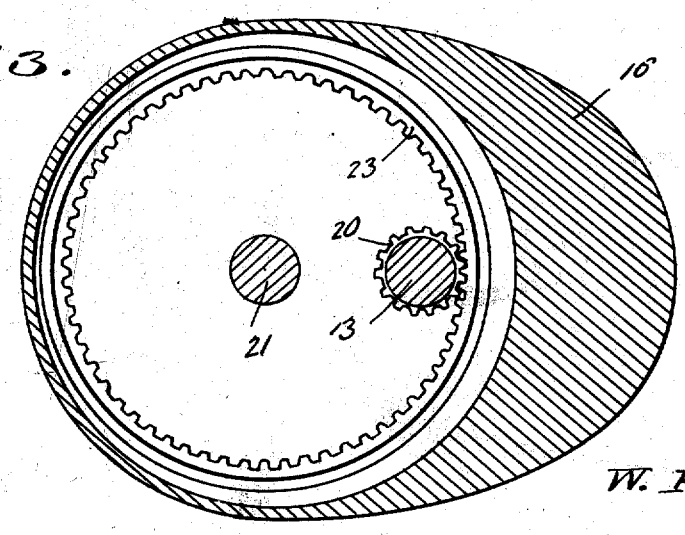

In the drawing:

Figure 1 is a sectional elevation of a mixing machine showing my improved drive mechanism in vertical section; and Figures 2 and 3 are horizontal sections through the drive mechanism, taken respectively on the lines 2—2 and 3—3 of Figure 1.

Referring to the drawing in detail, it will be seen that the mixing machine, which I have disclosed by way of example includes, among other elements, a supporting structure 5, rising from a base 6. The lower portion of the supporting structure 5 has mounted thereon a mixing vessel 7. A beater 8 is operable in said vessel 7. The parts thus far described may be of any conventional or preferred formation, and are disclosed herein merely to bring out the advantages of my improved drive mechanism.

A pinion of the bevelled type is denoted by the numeral 9 and is mounted on a drive shaft 10, journaled in any preferred manner, in the supporting structure 5. A casing 11 is mounted on the supporting structure 5 and has a bearing sleeve 12 extending vertically thereof. A shaft 13 is journaled in the sleeve 12 and has a bevelled pinion 14 keyed to the upper end thereof and meshing with the bevelled pinion 9. Anti-friction bearings 15 are provided at the top of the bearing sleeve 12, for the shaft 13. A casing 16 is rotably suspended from the housing 11, through anti-friction bearings 17 and 18, both of which are disposed about the bearing sleeve 12 at the intermediaate portion and the lower end portion respectively thereof. An anti-friction bearing 19 is mounted in the casing 16 and receives the lower end of the shaft 13, on which is mounted a spur gear 20. A shaft 21 is journaled in anti-friction bearings 22, in the casing 16 and at its upper end has a spur gear 23 fixed thereto and meshing with an internal gear 24, fixed to the bearing sleeve 12. The upper end of the beater 8 is keyed to the lower end of the shaft 21 and is rotatable in the lower end of the casing 16 by means of anti-friction bearings 25. An internal gear 26 is keyed as at 27 on the shaft 21 and the spur gear 20 meshes therewith. The particular features of the bearings and the casing and housing are not essential to this invention. The essential features are in the drive whereby the shaft 13, which is driven through the pinions 9 and 14 drives the shaft 21 through gears 20 and 26. This causes a direct drive to the beater 8 and an indirect drive through gears 23 and 24, for causing the axis of the beater to travel in a circular orbit within the vessel 7.

I appreciate that there are mixing machines similar in many respects to that shown herein by way of example, but there is none with which I am familiar that has a direct drive to the beater, such as the one described above and shown in the drawings. It is this particular drive which I desire to obtain protection upon, because on all other machines of this type, the beater driving gear which is attached to the beater spindle direct varies in most cases from one and seven-eighth inches to approximately two and one-half inches in diameter, the size being limited owing to the construction used.

In the construction shown herein, I am virtually unlimited in the size of the gear on the beater spindle which permits the efficient mixing action to be carried to an indefinite size of mixing bowl or vessel. Thus, at present the commercial mixing bowl is limited to approximately twenty inches in diameter at its largest, whereas my design will permit the diameter of the mixing bowl being of any practical diameter within reason.

It is thought that the construction, operation, and advantages of this invention will now be quite apparent to those skilled in this art without a more detailed description thereof.

The present embodiment of the invention has been disclosed in detail merely by way of example, since in actual practice, it attains the features of advantage enumerated as desirable in the statement of the invention and the above description. It will be apparent that the changes in the details of construction, and in the combination and arrangement of parts may be resorted to, without departing from the spirit or scope of the invention as hereinafter claimed or sacrificing any of its advantages.

Having thus described my invention, what I claim is:

In a mixing machine, a supporting structure having an internal gear fixed thereto, a drive shaft rotatable on said structure and having its axis coincident with the axis of said gear, a driven shaft parallel to said drive shaft and having a pinion thereon in mesh with said gear, means for rotatably supporting said driven shaft on said structure, an internal gear fixed to said driven shaft, and a pinion on the drive shaft in mesh with the last named internal gear.

In testimony whereof I have signed my name to this application for reissue.

WALTER F. DEHUFF.